N. W. WALTON & J. L. CUNNINGHAM.
Bee-Hives.
No. 142,537.
Patented September 2, 1873.
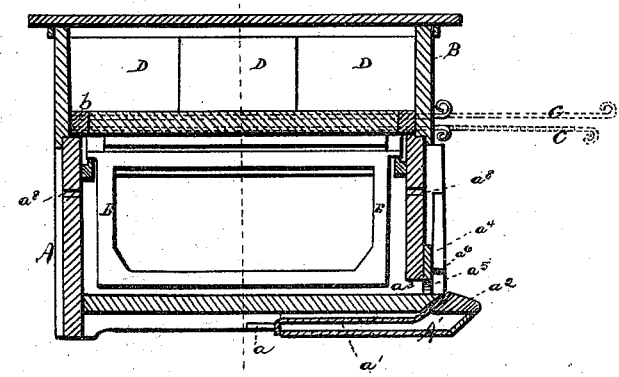
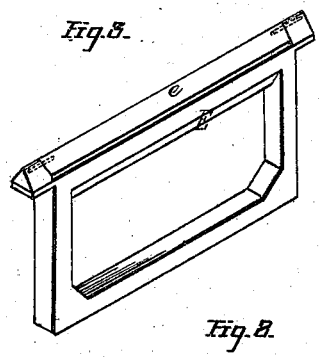
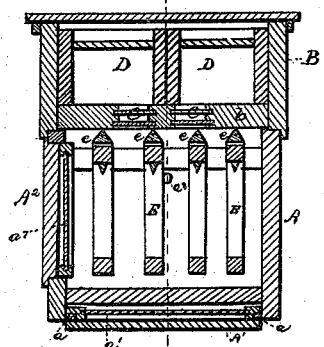

UNITED STATES PATENT OFFICE.

NATHANIEL W. WALTON AND JAMES L. CUNNINGHAM, OF PENNSBOROUGH, WEST VIRGINIA; SAID WALTON ASSIGNOR TO SAID CUNNINGHAM.

IMPROVEMENT IN BEE-HIVES.

Specification forming part of Letters Patent No. 142,537, dated September 2, 1873; application filed January 22, 1873.

*To all whom it may concern:*

Be it known that we, NATHANIEL W. WALTON and JAMES L. CUNNINGHAM, of Pennsborough, in the county of Ritchie and State of West Virginia, have invented an Improved Bee-Hive, of which the following is a specification:

The nature of this invention consists in the employment of a detachable moth-trap having a sliding cover, and adjusted in place upon rails attached to the sides of the hive, or in any other available way, the forward end of which trap forming the alighting-platform for the bees; of a comb-frame supplied with an enlarged pivoted additional upper bar, with its upper surface dressed or beveled to an apex, or to an acute or other angle, substantially as hereinafter more fully set forth.

In the drawing, Figure 1 represents a longitudinal, and Fig. 2 a transverse, section of our improved bee-hive. Fig. 3 is a perspective, and Fig. 4 a cross-sectional, view of the comb-frame.

Like letters of reference in the several figures are used in the designation of corresponding parts.

The body or main section A of the hive is of the ordinary construction, and has its sides dependent a short distance below its bottom, to permit of the attachment thereto, by nails or otherwise, of bars or ways $a$. Upon these ways is adjusted the moth-trap $A^1$, which, in the present instance, consists of a dish or receptacle cut from a single piece of wood, scooped out or recessed, and supplied with a metallic lining, $a^1$. This cover can be removed, when required, in consequence of the manner in which it is inserted into the said receptacle. To the forward end of the moth-trap $A^1$ is attached in any suitable way, or formed therewith, the alighting-platform $a^2$ for the bees. The moth-trap, to be set or adjusted to deter the moth or worms entering the bee entrances or orifices, is pulled out so that the alighting-platform $a^2$ shall stand isolated from the hive or bee-entrances, thereby creating a passage or entrance for the moth to crawl into the moth-trap, and which passage also cuts off all access or communication of the moth with the hive.

A continuous opening, $a^3$, constituting the bee-entrance at large, is cut in the lower front part of the hive. Over this opening fits a slide, $a^4$, suitably held in place to the hive, and constructed with a number of apertures, $a^5$, which divide the main bee-entrance $a^3$ into a series of smaller bee-entrances. (See Fig. 1.) To conceal the bee-entrances from the view of the moth upon the exterior of the front part of the hive, and to direct them down into the moth-trap, conical-shaped guards or sheds $a^6$ are fastened to the hive so as to overhang the said entrances. The said main section or body of hive is further provided with a door, $A^2$, opening laterally, and is for the purpose of obtaining a view of the bees at work upon the comb-frames. To prevent the bees escaping, and to permit of their being seen when the door $A^2$ is opened, a transparent or glass one, $a^7$, is suitably disposed upon the inside of the hive, and so as to fit the size of the opening of the said door $A^2$. The door $a^7$ can be readily removed when it is desired to take out one or more comb-frames. Ventilating-apertures $a^8$ $a^8$ are supplied to the body A of the hive. B refers to the upper or detachable part of the hive, which is supplied with a double longitudinally-slotted bottom, $b$, which forms a partition between the two parts of the hive. Within this bottom or partition, and fitting over its longitudinal slots, are two sets of slides, C C, each set consisting of one perforated and one imperforated slide, arranged vertically with reference to each other, so as that the passage of the bees may at any time be stopped or cut off from the surplus honey-boxes lodged upon the said partition within the section B of the hive. Through these slides the surplus honey-boxes, designated by the letters D D, can be ventilated to suit the temperature of the lower section of hive. The covers of the honey-boxes are designed to be made of glass. E refers to the comb frame or bearer, of which a suitable number may be adjusted or supplied to the hive in the ordinary way. (See Figs. 1 and 3.)

Ordinarily, the upper bar of the comb-frame is stationary, and consequently, when connected to the abutting comb-frames by the comb of the bees, it is inseparable, unless it (the said frame) be removed from the hive together with the adjoining frames, at which time it only can be severed from the latter. To overcome this difficulty and trouble an additional upper bar, $e\ e$, is pivoted or journaled between lugs fastened in a suitable way to the upper end of the frame E, or to the ordinary comb-frame, (see Figs. 3 and 4;) as it will be seen that upon revolving the movable bar or cap $e$ the connection between it or the comb-frame and the abutting or adjoining ones will be severed, leaving a space or spaces between them, so that the comb will be simply attached to it, or a comb be attached separately to each frame, which will enable one frame at a time, as it is filled by the bees, to be taken out of the hive. To provide for space between the caps or upper bars of the comb-frames, each of said caps is dressed or beveled to an acute or other angle upon its upper surface. This space or spaces also provides passages for the ascent to and the descent from the surplus-honey boxes of the bees.

Having thus described our invention, what we claim, and desire to secure by Letters Patent, is—

1. The adjustable and detachable moth-trap composed of the receptacle $A^1$, with the alighting-platform $a^2$ for the bees, and of the sliding or adjustable cover $a^1$, substantially as shown and described, and for the purpose set forth.

2. In combination with a comb-frame, the pivoted cap $e$, substantially as shown and described, and for the purpose specified.

In testimony whereof we have hereunto signed our names this 18th day of January, A.D. 1873, in presence of two subscribing witnesses.

NATHANIEL W. WALTON.
JAS. L. CUNNINGHAM.

Witnesses:
M. H. TARLETON,
JAMES A. HEATON.